United States Patent [19]
Greminger, Jr. et al.

[11] 3,954,626
[45] May 4, 1976

[54] WELL TREATING COMPOSITION AND METHOD

[75] Inventors: George K. Greminger, Jr., Midland, Mich.; Carl P. Strange, Walker, La.; Samuel A. Pence, Jr., Tulsa, Okla.

[73] Assignee: The Dow Chemical Company, Midland, Mich.

[22] Filed: Sept. 24, 1973

[21] Appl. No.: 400,278

[52] U.S. Cl. .......................... 252/8.55 R; 166/308; 252/316
[51] Int. Cl.² .................................... E21B 43/26
[58] Field of Search ....................... 166/283, 308; 252/8.55 R, 8.55 C, 316; 106/189

[56] References Cited
UNITED STATES PATENTS

| 3,310,112 | 3/1967 | Nielsen | 166/308 |
| 3,368,627 | 2/1968 | Hurst et al. | 166/308 X |
| 3,388,082 | 6/1968 | Rodgers et al. | 106/198 X |
| 3,664,422 | 5/1972 | Bullen | 166/283 |
| 3,696,035 | 10/1972 | Nimerick | 252/8.55 |
| 3,727,688 | 4/1973 | Clampitt | 166/283 |
| 3,765,488 | 10/1973 | Pence | 166/308 |
| 3,839,319 | 10/1974 | Greminger et al. | 106/189 X |

*Primary Examiner*—Herbert B. Guynn
*Attorney, Agent, or Firm*—Richard W. Hummer

[57] ABSTRACT

Novel compositions comprise homogeneous mixtures of liquid carbon dioxide and an anhydrous lower alkanol gelled to a viscosity of at least 10 centipoises with a hydroxypropyl methylcellulose having a methoxyl degree of substitution of from 0.2 to 1.0 and a molar substitution of hydroxypropoxyl of at least 1.2. The compositions are employed in a method of treating a subterranean formation penetrated by a wellbore by injecting same under pressure down the wellbore and into the formation to stimulate production of natural gas or petroleum.

14 Claims, No Drawings

WELL TREATING COMPOSITION AND METHOD

BACKGROUND OF THE INVENTION

In a copending application of Samuel E. Pence Jr., Ser. No. 241,816, filed Apr. 6, 1972, now Pat. No. 3,765,488 for Well Treating Method, there is disclosed a method for treating a subterranean formation by injecting thereinto an essentially anhydrous mixture comprising liquid carbon dioxide and an alcohol, such as methanol, gelled to a viscosity of at least 10 centipoises with a hydroxyalkyl cellulose such as hydroxypropylcellulose. Said method achieved rapid commercial success since it made possible the use of propping agents such as sand with the volatile fracturing fluids, such as liquid carbon dioxide as taught in U.S. Pat. No. 3,108,636 or mixtures of liquid carbon dioxide with liquefied petroleum gas (LPG) as disclosed in U.S. Pat. No. 3,368,627, whereby natural gas production can be stimulated by fracturing techniques without leaving undesired residues in the producing formation.

In field practice, however, the available alcohol-soluble hydroxypropylcellulose materials have shown certain disadvantages. For example, these materials are characterized by a degree of plasticity such that caking can occur in storage or shipment and the caked material becomes difficult to disperse and dissolve in alcohol with the equipment available for a well-head operation. Further it has been found that even when relatively finely divided hydroxypropylcellulose is well dispersed in an alcohol, such as methanol, the resulting dispersion requires a considerable period of aging to accomplish complete solvation of the hydroxypropylcellulose and to develop the desired viscosity of the gelled alcohol. Thus, in practice, it has generally been necessary to disperse the hydroxypropylcellulose in the large amount of methanol necessary for a fracturing job on one day and allow the aging to proceed overnight before the gelled alcohol is ready for use. Finally it has been found that available supplies of hydroxypropylcellulose are soluble only to the extent of about 100 pounds per 1000 gallons of anhydrous methanol at ambient temperatures which places an upper limit on attainable viscosities with such agents.

Accordingly, it is an object of the present invention to provide compositions containing liquid carbon dioxide and a gelled substantially anhydrous alcohol comprising an improved gelling agent and to provide a method for treating subterranean formations with the improved composition.

SUMMARY OF THE INVENTION

In accordance with the present invention there is provided a novel and improved method of treating a subterranean formation penetrated by a wellbore employing a novel composition comprising liquid carbon dioxide and an essentially anhydrous alcohol, containing 1 to 3 carbon atoms, gelled to a viscosity of at least 10 centipoises, preferably of from 100 to 300 centipoises, with a hydroxypropyl methylcellulose having a critical composition as hereinafter defined.

The hydroxypropyl methylcellulose compounds employed as gelling agents in accordance with the present invention are characterized by having a methoxyl degree of substitution (D.S.) from about 0.2 to about 1.0, preferably from 0.5 to 0.95, and a molar substitution (M.S.) of hydroxypropoxy substitution of at least about 1.2 and preferably from about 1.3 to 2.2 provided that the sum of said D.S. and M.S. is at least about 1.8. These cellulose ethers are characterized by solubility in anhydrous lower alkanols, particularly methanol, and by compatibility of their anhydrous alcohol solutions with liquid carbon dioxide and with mixtures of liquid carbon dioxide and liquefied petroleum gas. It is among the advantages of the invention that the above defined hydroxypropyl methylcellulose compounds solvate rapidly in anhydrous methanol to provide a solution having substantially fully developed viscosity in as little as thirty minutes after the cellulose ether is dispersed in the methanol. The expressions "D.S." and "M.S." are employed herein in accordance with established usage in the cellulose ether art as shown for example, in U.S. Pat. Nos. 3,388,082 and 3,278,520. For best results with respect to ease of dispersibility and rapid solvation it is preferred to employ the hydroxypropyl methylcellulose in the form of a granular powder ground to pass a screen having 30 meshes to the inch.

The hydroxypropyl methylcellulose compounds employed herein are prepared by reacting alkali cellulose with a mixture of methyl chloride and propylene oxide at temperatures of from about 50°C. to about 75°C. Certain of these cellulose compounds may be prepared as shown in U.S. Pat. No. 3,388,082. Preferably, alkali cellulose is prepared by reacting a good grade of cellulose with a concentrated sodium hydroxide solution in amount to provide from about 0.25 to about 0.45 part by weight of sodium hydroxide per part of cellulose. The resulting alkali cellulose is reacted in the substantial absence of oxygen with a mixture containing from about 1.5 to 4 parts of propylene oxide and from about 0.4 to about 0.8 part of methyl chloride per part by weight of cellulose in the alkali cellulose, the amounts of propylene oxide and methyl chloride employed in the total reaction being adjusted to provide at least 1 mole of methyl chloride for each mole of sodium hydroxide incorporated in the alkali cellulose and at least 2 moles of propylene oxide per mole of methyl chloride employed. The alkali cellulose, methyl chloride and propylene oxide are mixed in a pressure vessel at or below room temperature and the resulting mixture heated at gradually increasing temperatures to a reaction temperature of from about 50°C. to about 75°C. and maintained at the reaction temperature for a period of time to complete the reaction.

Representative hydroxypropyl methylcellulose compounds prepared in the above manner were analyzed for methoxyl and hydroxypropoxyl content and the methoxyl D.S. and hydroxypropoxyl M.S. calculated from the results as summarized in the following table.

| Product | Methoxyl Content % by wt. | D.S. | Hydroxypropoxyl Content % by wt. | D.S. |
|---|---|---|---|---|
| A | 8.3 | 0.69 | 43.3 | 1.49 |
| B | 11.0 | 0.86 | 36.7 | 1.19 |
| C | 12.0 | 0.95 | 37.0 | 1.21 |
| D | 4.6 | 0.41 | 50.3 | 1.84 |

Each of these products was readily soluble in anhydrous methanol to form a highly viscous solution containing 1 percent by weight of the cellulose ether compound.

In practice, the hydroxypropyl methylcellulose is dispersed in the essentially anhydrous alkanol, preferably methanol, with shearing agitation to assure thorough dispersion and the resulting mixture is maintained for a period of from about 30 minutes to about one hour to complete solvation of the cellulose compound and produce a viscous gel. The hydroxypropyl methylcellulose may be employed in amounts of from about 40 to 200 pounds per 1000 gallons of the alcohol to produce gels having viscosities of from about 10 to 900 centipoises as determined with a Fann VG Meter, Model 35 using the R1-B1 spindle and bob at 100 revolutions per minute (Shear rate: 160 per second). For most operations it is preferred to employ from about 80 to 120 pounds of the cellulose ether compound per 1000 gallons of anhydrous methanol to produce gels having viscosities of from about 120 to about 300 centipoises.

Of the operable alcohols, methanol is preferred due to its favorable effect on the critical properties of the liquefied gases. In addition, the use of methanol as the gelled organic fluid is advantageous for the reason that methanol aids in dehydrating the producing formation and removing interstitial water. The use of methanol is also desirable for the role it plays in lowering the temperature at which solid gas hydrates form, thereby reducing the tendency toward plugging of the gas-producing equipment by such solid gas hydrates. Other alcohols such as ethanol, propanol and isopropanol may be employed when it is desirable to further increase the critical temperature of the liquefied gases. In addition, Liquid Petroleum Gas (LPG) may be, and normally is, mixed with the liquid $CO_2$ to provide a mixture having a higher critical temperature than $CO_2$ alone. The relative proportions of LPG and $CO_2$ will normally vary from 5% to 95% mole fraction of each to make up a total of 100%. The amount of LPG to be blended with the $CO_2$ will vary depending on the critical properties desired. In arctic regions where the bottom hole temperature remains below 88°F. pure $CO_2$ will be satisfactory. In warmer regions, where bottom hole temperatures are such that it is difficult or impossible to maintain $CO_2$ in the liquid state, LPG will be blended in. The amount of LPG to be employed will depend on the critical properties desired and can be readily determined by the art skilled, cf. U.S. Pat. No. 3,368,627. In addition, the type and amount of alcohol used will have an effect on the critical properties of the composition. For example, it has been found that a 1:1:1 weight ratio mixture of $CO_2$:LPG:gelled methanol will have a critical temperature of about 15% higher than the $CO_2$/LPG mixture alone. Higher alcohols will raise the critical temperature even more provided they are employed in sufficiently high concentration.

In field preparations of the compositions and in carrying out the method of the invention the hydroxypropyl methylcellulose is dispersed mechanically in the alkanol while employing good mixing, such as recirculation through a pump, to assure uniformity of the resulting solution, the cellulose ether compound being added in a predetermined amount sufficient to produce the desired final viscosity of the solution. On completion of the addition of the hydroxypropyl methylcellulose the resulting mixture is circulated for 30 to 60 minutes to assure completion of solvation. Liquid carbon dioxide or more usually a mixture of liquid carbon dioxide and LPG is then introduced into the wellbore by suitable high speed, high pressure pumping equipment and the pressure is brought up sufficiently to fracture the subterranean formation being treated. When fracturing occurs the gelled alcohol is introduced through high pressure pumps to mix with the $CO_2$ and/or LPG at the wellhead. Generally, enough of the resulting gelled fluid is introduced to fill the pipe string or casing above the formation and thereafter a suitable propping agent such as nut shells, glass beads or preferably sand is introduced in admixture with the gelled alcohol. Finally, the propping agent is cut off and sufficient of the gelled liquid and finally of the $CO_2$—LPG mixture is flushed through the piping to drive all of the sand and gel into the formation. Preferably just before pumping the gelled alcohol into the well a breaking agent such as hydrochloric acid or a persulfate is added to cause the gel to lose viscosity within a few hours after it is in place in the formation.

In a representative operation, a gas well near Sonora, Tex., which had been completed and cased to a depth of over 7298 feet, had been perforated at 5 producing zones from the 7151 foot level to the 7298 foot level and equipped with a pipe string and packer at the 7145 foot level. On test before treatment the well was found to be producing gas at a rate of 59,000 cubic feet per day. Hydroxypropyl methylcellulose having a methoxyl D.S. of about 0.7 and a hydroxypropoxy M.S. of about 1.5 was added through a disperser into 240 barrels of anhydrous methanol at the rate of 100 pounds of the cellulose compound per 1000 gallons of methanol. During the addition and thereafter the methanol was circulated through a pump. Twenty five minutes after completion of the addition a sample of the gelled methanol was tested with the Fann VG Meter and found to have an apparent viscosity of 204 centipoises at 100 rpm. Thereafter a mixture of liquid $CO_2$ and LPG in a volume ratio of 9 to 13 was pumped into the well and brought up to fracturing pressure of about 5000 pounds per square inch. When breakdown occurred the gelled methanol was added through a cross fitting at the well head at the rate of 1 volume thereof to 2 volumes of the $CO_2$—LPG mixture. Pumping of the combined gelled liquids continued at 10 barrels per minute at 5000 psi pressure and 20/40 mesh sand was added with the gelled methanol at the rate of 3 pounds of sand per gallon of gel. As the gelled methanol was fed 20 gallons of concentrated hydrochloric acid per 1000 gallons of gel was added to act as a breaker in the formation. Before the gelled methanol was exhausted the sand was cut off and on completion of injection of the gel residual $CO_2$—LPG was employed to push the gel into the formation. A total of 13,100 gallons of LPG and 9000 gallons of liquid $CO_2$ was employed. The well was then shut in while the fracturing equipment was removed and then vented cautiously to a safe wellhead pressure. On testing three weeks after the above treatment, the well was found to be producing gas at the rate of 700,000 cubic feet per day.

Various ratios of the liquid components of the treating fluid can be employed depending upon the particular conditions in the producing formation. Good results have been obtained with equal volumes of liquid $CO_2$, LPG and gelled methanol at low to moderate bottom hole temperatures. At higher temperatures it is desirable to increase the volumes of gelled methanol and LPG in relation to liquid $CO_2$. With well temperatures in the range of 70°–90°F. compositions containing 3 volumes of liquid $CO_2$ to one volume each of LPG and gelled alcohol may be employed while with temperatures of around 300°F. and greater, good results have been obtained when employing one volume of liquid $CO_2$ with nine volumes of LPG and five volumes of gelled alcohol. At the higher temperatures it is also desirable to employ an LPG fraction of higher boiling range.

We claim:

1. In a method for fracturing a subterranean formation penetrated by a wellbore which comprises injecting down the wellbore and subjecting to fracturing pressure an essentially anhydrous mixture comprising liquid carbon dioxide and an alkanol of 1 to 3 carbon atoms gelled to a viscosity of at least 10 centipoises with a cellulose ether compound, the improvement which comprises employing as gelling agent a hydroxypropyl methylcellulose having a methoxyl D.S. of from about 0.2 to about 1.0 and a hydroxypropoxyl M.S. of at least about 1.2 and wherein the sum of said D.S. and M.S. is at least about 1.8.

2. The method of claim 1 wherein the amount of hydroxypropyl methylcellulose is adjusted to produce a gelled alkanol having an apparent viscosity of from about 120 to about 300 centipoises.

3. The method of claim 1 wherein the hydroxypropyl methylcellulose has a hydroxypropoxyl M.S. of from about 1.2 to about 2.2.

4. The method of claim 3 wherein the hydroxypropyl methylcellulose has a methoxyl D.S. of from 0.5 to 0.95.

5. The method of claim 1 wherein the alkanol is essentially anhydrous methanol.

6. The method of claim 1 wherein the liquid carbon dioxide is combined with liquid petroleum gas.

7. The method of claim 1 wherein the gelled alkanol carries a propping agent.

8. The method of claim 7 wherein the propping agent is sand.

9. An anhydrous composition for fracturing a subterranean formation which comprises liquid carbon dioxide and an essentially anhydrous alkanol containing 1 to 3 carbon atoms and gelled to a viscosity of at least 10 centipoises with a hydroxypropyl methylcellulose have a methoxyl D.S. of from about 0.2 to about 1.0 and a hydropropoxyl M.S. of at least about 1.2 and wherein the sum of said D.S. and M.S. is at least about 1.8.

10. The composition of claim 9 wherein the hydroxypropyl methylcellulose has a hydroxypropoxyl M.S. of from about 1.2 to about 2.2

11. The composition of claim 10 wherein the hydroxypropyl methylcellulose has a methoxyl D.S. of from 0.5 to 0.95.

12. The composition of claim 9 wherein the hydroxypropyl methylcellulose is employed in the amount of from 40 to 200 pounds per 1000 gallons of the alkanol.

13. The composition of claim 12 which contains as a third component liquid petroleum gas (LPG).

14. A composition according to claim 13 wherein the proportions of liquid carbon dioxide to LPG to gelled alkanol by volume range, respectively, from 3 to 1 to 1 to 1 to 9 to 5.

* * * * *